US010652821B2

(12) United States Patent
Doyle et al.

(10) Patent No.: US 10,652,821 B2
(45) Date of Patent: *May 12, 2020

(54) SAFE ZONE CREATION TO REDUCE POWER CONSUMPTION IN AN ELECTRONIC DIGITAL TRACKING DEVICE

(71) Applicant: Mars, Incorporated, McLean, VA (US)

(72) Inventors: Thomas F. Doyle, San Francisco, CA (US); James C. Brailean, San Francisco, CA (US); Kevin Lloyd, San Francisco, CA (US)

(73) Assignee: Mars, Incorporated, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/979,164

(22) Filed: May 14, 2018

(65) Prior Publication Data

US 2018/0262988 A1 Sep. 13, 2018

Related U.S. Application Data

(63) Continuation of application No. 14/988,613, filed on Jan. 5, 2016, now Pat. No. 9,974,020.

(Continued)

(51) Int. Cl.
*G08B 23/00* (2006.01)
*H04W 52/02* (2009.01)
(Continued)

(52) U.S. Cl.
CPC ...... *H04W 52/0225* (2013.01); *G08B 21/023* (2013.01); *G08B 21/0261* (2013.01); *G08B 21/0269* (2013.01); *G08B 21/0277* (2013.01);

*G08B 25/10* (2013.01); *H04L 67/22* (2013.01); *H04W 4/025* (2013.01); *H04W 4/029* (2018.02); *H04W 52/0216* (2013.01);
(Continued)

(58) Field of Classification Search
CPC ... H04W 52/0225; H04W 4/02; H04W 4/025; H04W 52/0229; H04W 52/0241; H04W 52/0216; H04W 64/00; H04W 4/029; G08B 25/10; G08B 21/023; G08B 21/0261; G08B 21/0269; G08B 21/0277; Y02D 70/164; Y02D 70/144; Y02D 70/26; Y02D 70/162; Y02D 70/00; Y02D 70/10; Y02D 70/142; H04L 67/22
USPC ..... 340/539.9, 539.13, 539.11, 693.3, 573.4, 340/539.19
See application file for complete search history.

(56) References Cited

U.S. PATENT DOCUMENTS 7,312,752 B2 12/2007 Smith et al.
7,639,131 B2 12/2009 Mock et al.
(Continued)

*Primary Examiner* — Anh V La
(74) *Attorney, Agent, or Firm* — Mars, Incorporated; Rebecca M. Barnett

(57) ABSTRACT

A method for creating dynamic safe zones comprises determining, by a tracking device, the tracking device is outside a domicile, monitoring, by the tracking device, a location of the tracking device, in response to the location satisfying a condition, creating a safe zone for the tracking device, and while the tracking device is within the safe zone, reducing power consumption of the tracking device, wherein the method is performed using one or more computing devices.

20 Claims, 10 Drawing Sheets

Related U.S. Application Data

(60) Provisional application No. 62/099,975, filed on Jan. 5, 2015.

(51) Int. Cl.
*G08B 21/02* (2006.01)
*H04W 4/029* (2018.01)
*H04W 4/02* (2018.01)
*H04L 29/08* (2006.01)
*G08B 25/10* (2006.01)

(52) U.S. Cl.
CPC ... *H04W 52/0229* (2013.01); *H04W 52/0241* (2013.01); *Y02D 70/00* (2018.01); *Y02D 70/10* (2018.01); *Y02D 70/142* (2018.01); *Y02D 70/144* (2018.01); *Y02D 70/162* (2018.01); *Y02D 70/164* (2018.01); *Y02D 70/26* (2018.01)

(56) References Cited

U.S. PATENT DOCUMENTS

| | | | |
|---|---|---|---|
| 8,326,228 B2 | 12/2012 | Lewis et al. | |
| 8,878,670 B2 | 11/2014 | Rosen et al. | |
| 9,974,020 B1* | 5/2018 | Doyle | H04W 52/0225 |
| 2007/0247366 A1* | 10/2007 | Smith | G01S 5/021 |
| | | | 342/464 |
| 2008/0143604 A1* | 6/2008 | Mock | G01S 5/0205 |
| | | | 342/450 |
| 2010/0159833 A1* | 6/2010 | Lewis | H04W 4/80 |
| | | | 455/41.3 |
| 2012/0206296 A1 | 8/2012 | Wan | |
| 2015/0119070 A1 | 4/2015 | Harris et al. | |

\* cited by examiner

SOPHIE'S DAY ◁ Today ▷ Day History

Last Sync: 01:52 PM PDT Sep 19 ⓘ | Activity Tracking is ON     Take a Tour

Activity Snapshot as of 01:52 PM today                                    ⓘ

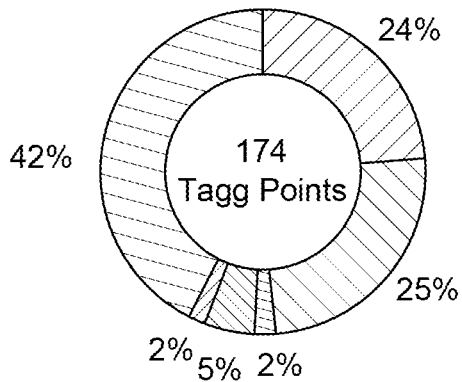

| Activity Category | Points |
|---|---|
| Resting | 18 |
| Lightly Active | 13 |
| Moderately Active | 85 |
| Highly Active | 58 |
| Data Pending | 0 |

Tagg Points for Today: 174
Current 30-Day Average: 0
Daily Tagg Activity Goal: (Set)

Sophie: 1-year-old female Golden Retriever, 24 inches tall, 72 lbs (update)

Legend:
— Resting
········ Lightly Active
---- Moderately Active
-·-·- Highly Active

Activity Timeline                                    ⓘ

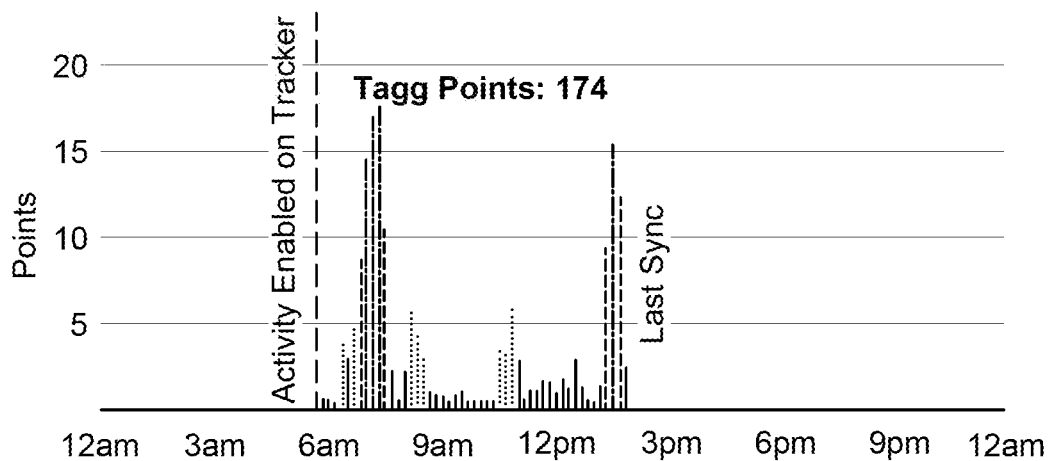

FIG. 4B

SAFE ZONE CREATION TO REDUCE POWER CONSUMPTION IN AN ELECTRONIC DIGITAL TRACKING DEVICE

RELATED APPLICATIONS

The present application is a continuation application of U.S. patent application Ser. No. 14/988,613, filed Jan. 5, 2016 and issued as U.S. Pat. No. 9,974,020 on May 15, 2018, which claims the benefit under 35 U.S.C. § 119(e) of provisional application 62/099,975, filed Jan. 5, 2015, the entire contents of which are hereby incorporated by reference for all purposes as if fully set forth herein.

FIELD OF THE DISCLOSURE

The present disclosure generally relates to wearable tracking devices and more specifically to systems and methods for power conservation of wearable tracking devices by dynamically creating safe zones.

BACKGROUND

The Global Positioning System ("GPS") includes a network of GPS satellites that orbit the Earth at an altitude of approximately 20,000 km. Typically, each GPS satellite broadcasts radio signals at regular intervals that a GPS receiver can receive and process to determine its location. As currently implemented, any GPS receiver on the Earth's surface should be in range of least four GPS satellites at any given time. Transmitted GPS radio signals include precise information about the satellite's position and time of transmission. Based on the received signals, a GPS receiver determines its location by calculating the distance from each of the satellites by calculating the amount of time that each respective signal took to arrive at the receiver.

Many wearable technologies incorporate GPS to allow for location-based functionalities. With advances in computing power and miniaturizing of electronic devices, wearable technology promises to interweave into everyday life. Although the possibilities are many, wearable technology can take the form of wearable computers, item location trackers, activity trackers, health monitors, and so-called smartwatches to name a few.

BRIEF DESCRIPTION OF THE DRAWINGS

FIG. 4A, FIG. 4B are charts illustrating activity measured using a tracker comprising an accelerometer for an example embodiment.

DETAILED DESCRIPTION OF THE DRAWINGS

Turning now to the drawings, systems and methods for power conservation of wearable tracking devices by dynamically creating safe zones in accordance with embodiments of the invention are illustrated. Typically, a tracking system utilizes more power when performing various tracking related checks and activities. In many embodiments, the primary domicile (home domicile) includes an area defined utilizing a beacon generator's home beacon signal as further described below. However, it may be beneficial to not perform power-hungry location checks when the item has come to rest at a temporary domicile (secondary domicile) after leaving its primary (home) domicile. In various embodiments, the tracking device (i.e. tracker) can monitor and detect a secondary domicile utilizing various sensors including (but not limited to) its accelerometer, GPS radio, and short range receiver (SRR), and/or user input. In several embodiments, upon detection of the secondary domicile, the tracking device can establish parameters for monitoring its new safe zone using various methods as described further below. Systems and methods for conserving power on wearable tracking systems in accordance with various embodiments are further discussed below.

Wearable Tracking Systems

Location-based tracking systems can be utilized to "keep track" of a person's and/or item's location. In many location-based systems boundaries are defined and GPS signals are used to monitor whether a tracked item crosses the boundary. Typically, when the system detects that the item has crossed a boundary (i.e. "breach" event), an alert can be sent to a user. Depending on the application, the system can be primarily concerned with exit breaches, entrance breaches, or both. Further, a tracking system can alert the user of a breach event and the location of the item using various methods including (but not limited to) an interactive map, text messages, and/or email messages.

Figure 1:
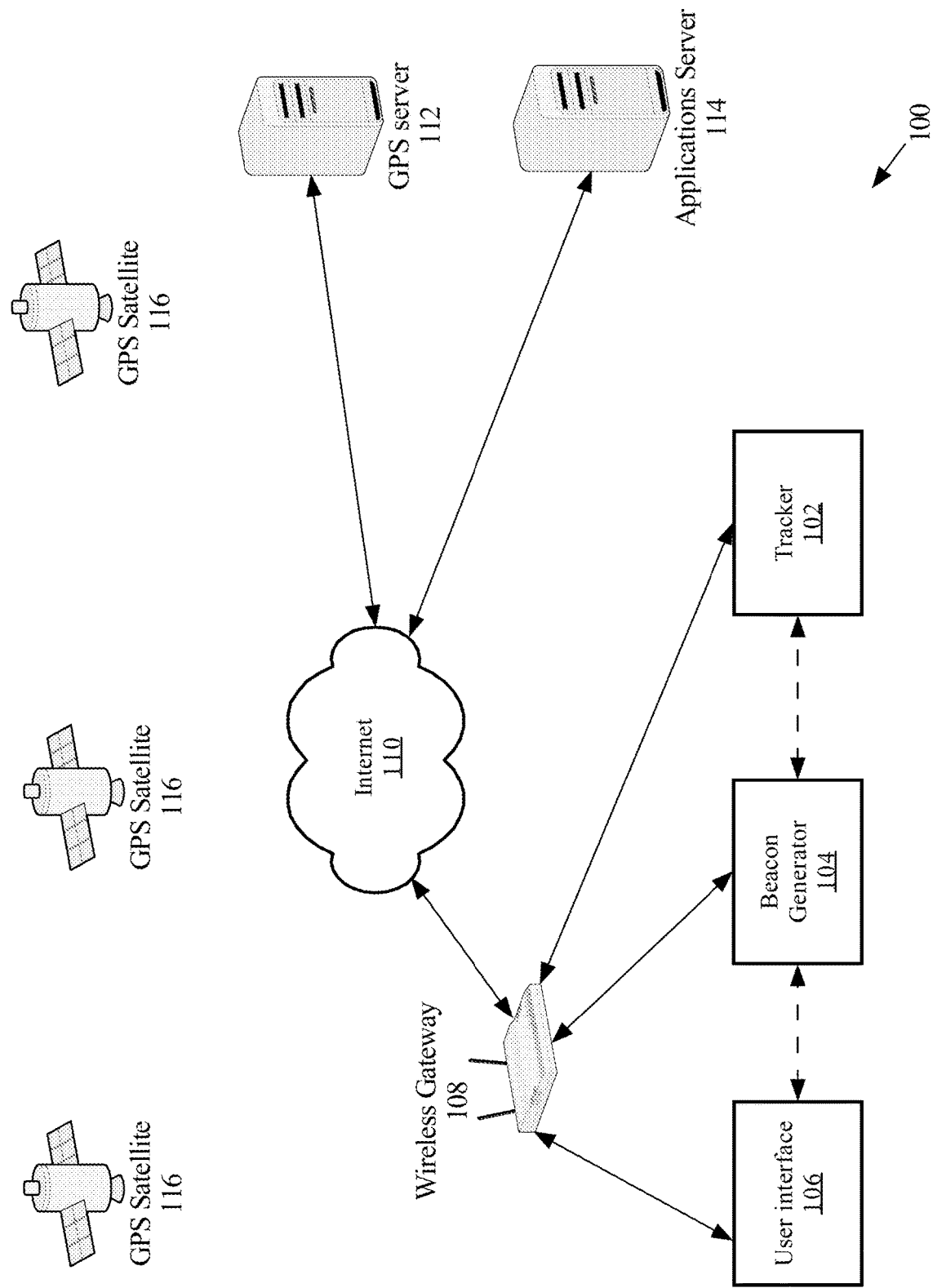
FIG. 1 is a system diagram of a GPS based tracking system for an example embodiment.

FIG. 1 illustrates a GPS based tracking system comprising a tracker and beacon generator for an example embodiment. The system 100 includes a tracker 102, beacon generator 104, user interface 106, wireless gateway 108, internet 110, GPS server 112, applications server 114, and GPS satellite 116. In many embodiments, the beacon generator can be powered utilizing a power source including (but not limited) to an AC power source. The tracker 102 often includes an internal battery that can be charged. Further, the system can include at least one user interface device 106 such as (but not limited to) a home computer, smartphone, tablet, and/or laptop for receiving user input and presenting alerts to the user. Typically, the user interface device 106 is configured to utilize a cellular data network 108 (i.e. wireless gateway) to connect to the Internet 110 to receive tracking related alerts from a GPS server system 112 and other information from an application server system 114 as further disclosed below. In several embodiments, beacon generator 104 can communicate with the user interface device 106 using either a direct or wireless connection in a manner well known to one of ordinary skill in the art. Likewise, user interface device 106 may communicate with tracker 102 using a direct or wireless connection. In other words, tracker 102, beacon generator 104, and user interface device 106 may be communicatively connected in any configuration using any method of wired or wireless communication. Alternatively, some combinations of tracker 102, beacon generator 104, and user interface device 106 may not be communicatively connected. Although a single wireless gateway 108 is depicted in FIG. 1, any number of wireless gateways may be present, each in a same or different location, using the same or different methods of communication. Further, user interface 106, beacon generator 104, and tracker 102 may connect to the same, or different, wireless gateways.

In various embodiments, the tracker can include various sensors including (but not limited to) an accelerometer and/or temperature sensors. Further, the tracker can also include a cellular radio to access the Internet 110 via the wireless gateway 108, and a GPS receiver to receive GPS signals from various GPS satellites 116 to determine the location of the tracker. In addition, the tracker can include one or many short range radio (SRR) receivers/transceivers (such as WiFi, Bluetooth, Zigbee, etc.) for detecting a home beacon signal transmitted by the beacon generator 104 as further described below.

Figure 2:
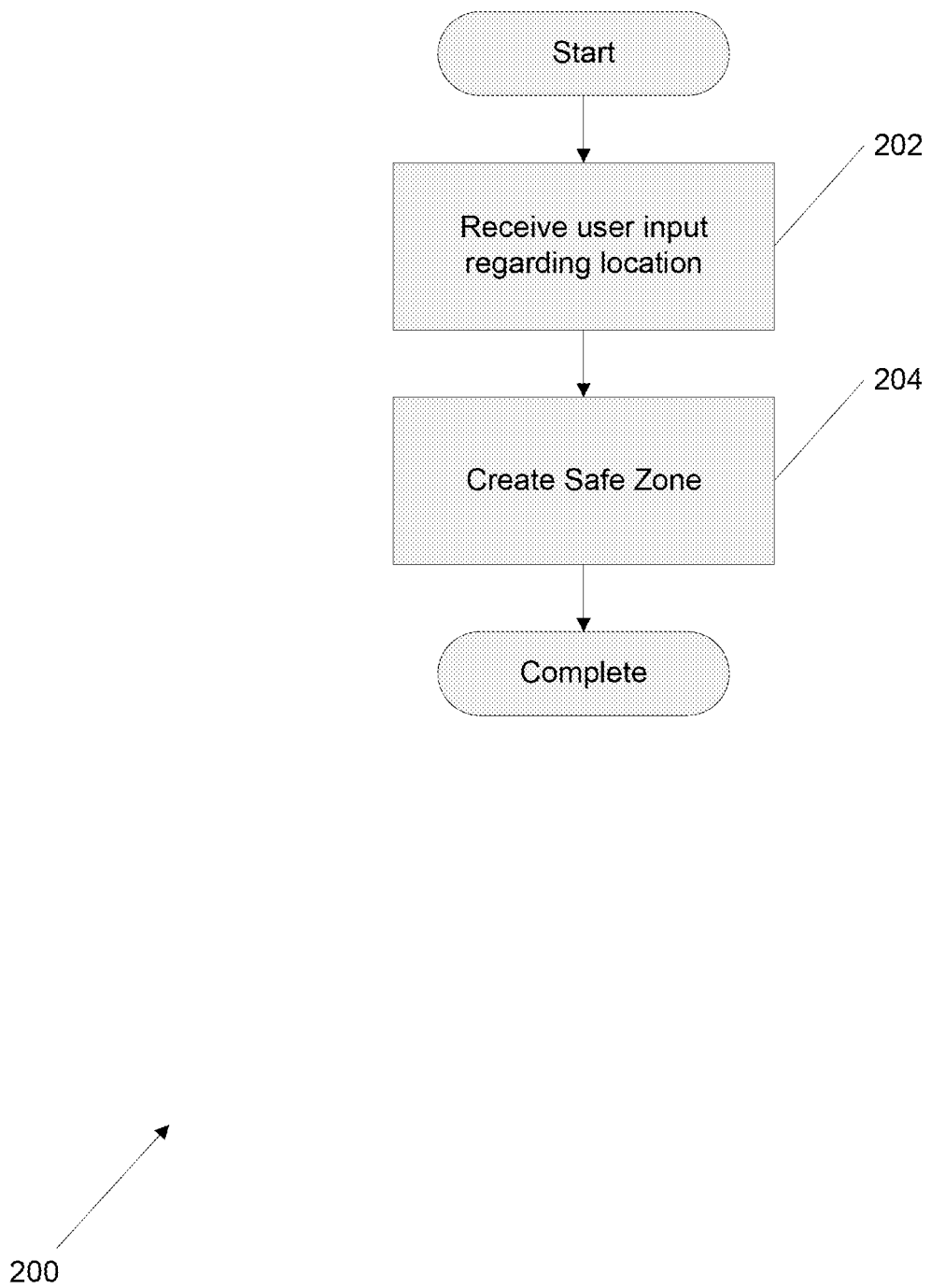
FIG. 2 is a flow chat that illustrates a process for creating a safe zone for an example embodiment.

FIG. 2 illustrates a process for creating a safe zone for an example embodiment. The process 200 includes receiving (202) a user input regarding a location to be monitored. In many embodiments, the user can input a location utilizing a variety of methods including (but not limited to) entering a street address, selecting a location on an interactive map presented to the user, and/or selecting the user, tracker, and/or beacon generator's present location.

Figure 3:
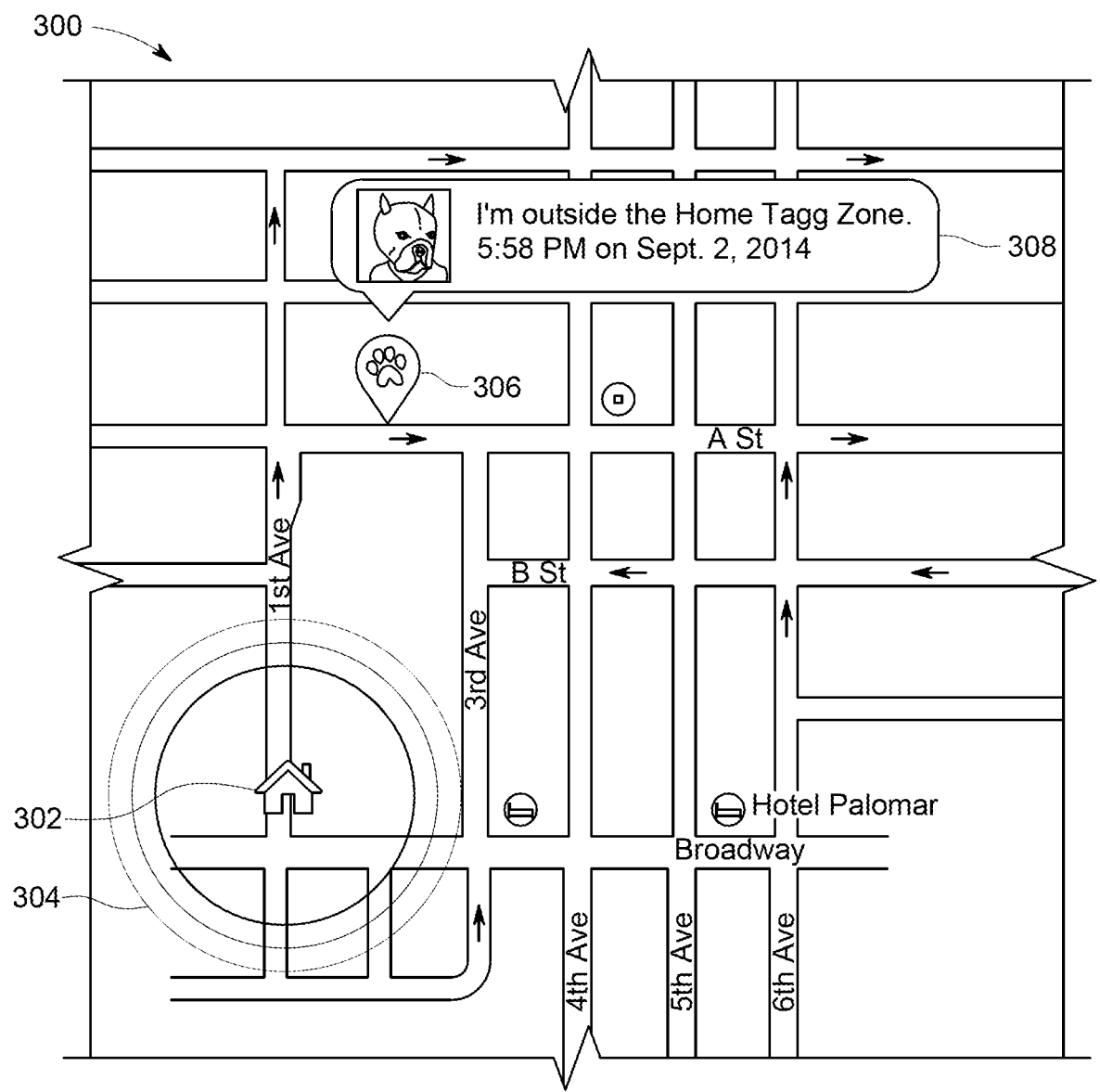
FIG. 3 is a screen shot of an interactive map illustrating a safe zone, breach event alert, and tracker location for an example embodiment.

FIG. 3 illustrates a screen shot of an interactive map illustrating a breach alert for an example embodiment. The interactive map 300 can include a home icon 302 with a surrounding boundary 304 to indicate the safe zone. The map can also include the item's current location 306 and other information 308 including (but not limited to) a personal message and the time and date of breach.

Figure 4A:
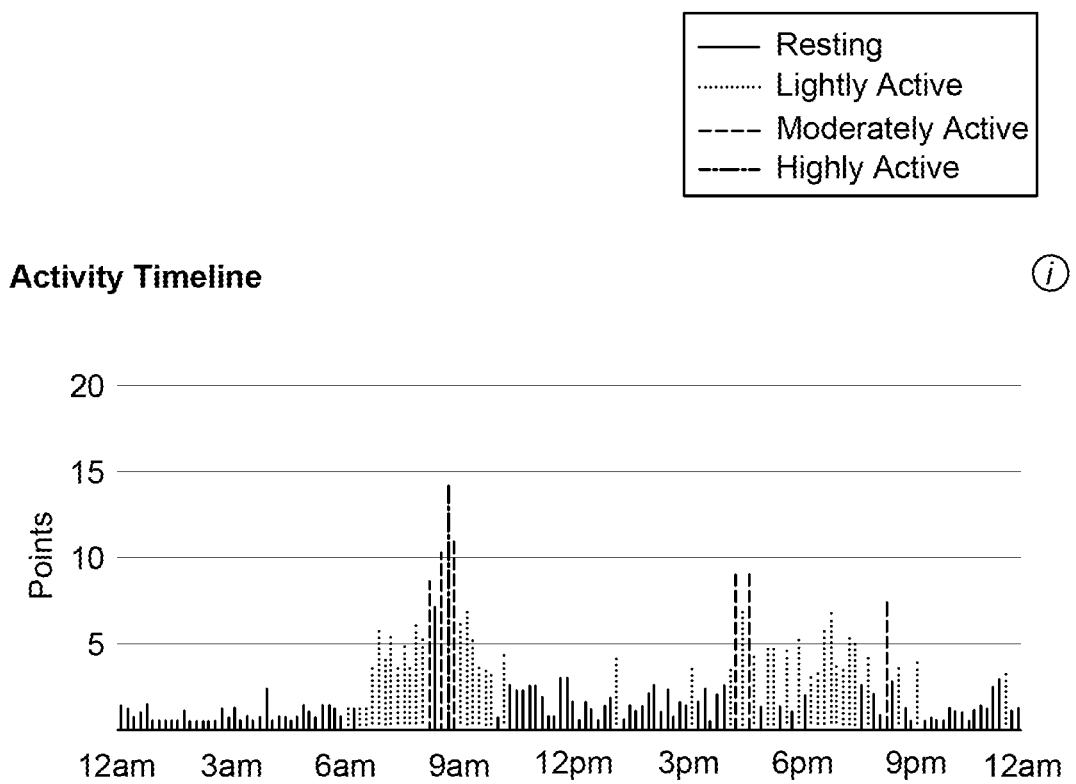

As discussed above, the tracker can also include sensors to gather various types of data for presentation to a user. FIG. 4A, FIG. 4B are charts illustrating activity levels of a dog wearing a tracker for an example embodiment. The charts illustrate data collected from an accelerometer in a tracker at various times of the day. In many embodiments, the collected data can be transferred from the tracker to beacon generator, user interface device, and/or an application server system for processing before presentation to the user.

Although specific location-based tracking systems using a tracker and beacon generator are discussed above with respect to FIG. 1, FIG. 2, FIG. 3, FIG. 4A, FIG. 4B, any of a variety of location-based tracking systems utilizing a tracker and beacon generator for monitoring location as appropriate to the requirements of a specific application can be utilized in embodiments. Further, although specific tracking systems are described above where particular components are described as performing particular functions, the various components may be configured to perform the functions of other components. For example, in many embodiments, the tracker, beacon generator, and/or the various servers can perform interchangeable functionalities such as (but not limited to) the tracker being configured to perform a variety of functions of the application server and vice versa. One of ordinary skill in the art would recognize that the logic between the tracker, beacon generator, and servers could be configured in various ways to accomplish many embodiments as connectivity between the components has become ubiquitous, reliable, and cost effective. Power consumption considerations in accordance with embodiments are discussed further below.

Power Consumption Considerations

In many wearable tracking devices, power consumption is often an important consideration since it directly impacts battery life and device size. Designs focused on power conservation often result in trade-offs with functionality, including choices involving location-based tracking and in particularly on the frequency of performing tracking related checks. Although reducing the frequency of checks can save power, it can also create delays in detecting breach events and thus degrade the user experience. Thus, rapid detection of events while minimizing power consumption can be important design considerations for wearable tracking devices.

In many embodiments, a tracker can contain multiple sensors and utilize a "layered" approach to monitoring and power conservation. In various embodiments, these sensors can include an accelerometer to sense motion, a GPS receiver to determine location (which can be integrated directly onto the cellular chipset), and a short-range radio (SRR) that listens to a stationary beacon generator broadcasting a beacon signal. Typically, the beacon generator is located at the domicile of the tracker and its beacon signal configured so that the signal approximately covers a typical home without exceeding the boundaries. Therefore, when the tracker detects the beacon, it knows that it is at the home/within the domicile. It is noteworthy that the detection of the beacon signal can also provide location information when indoors at home where GPS signals could usually not be acquired.

Figure 5:
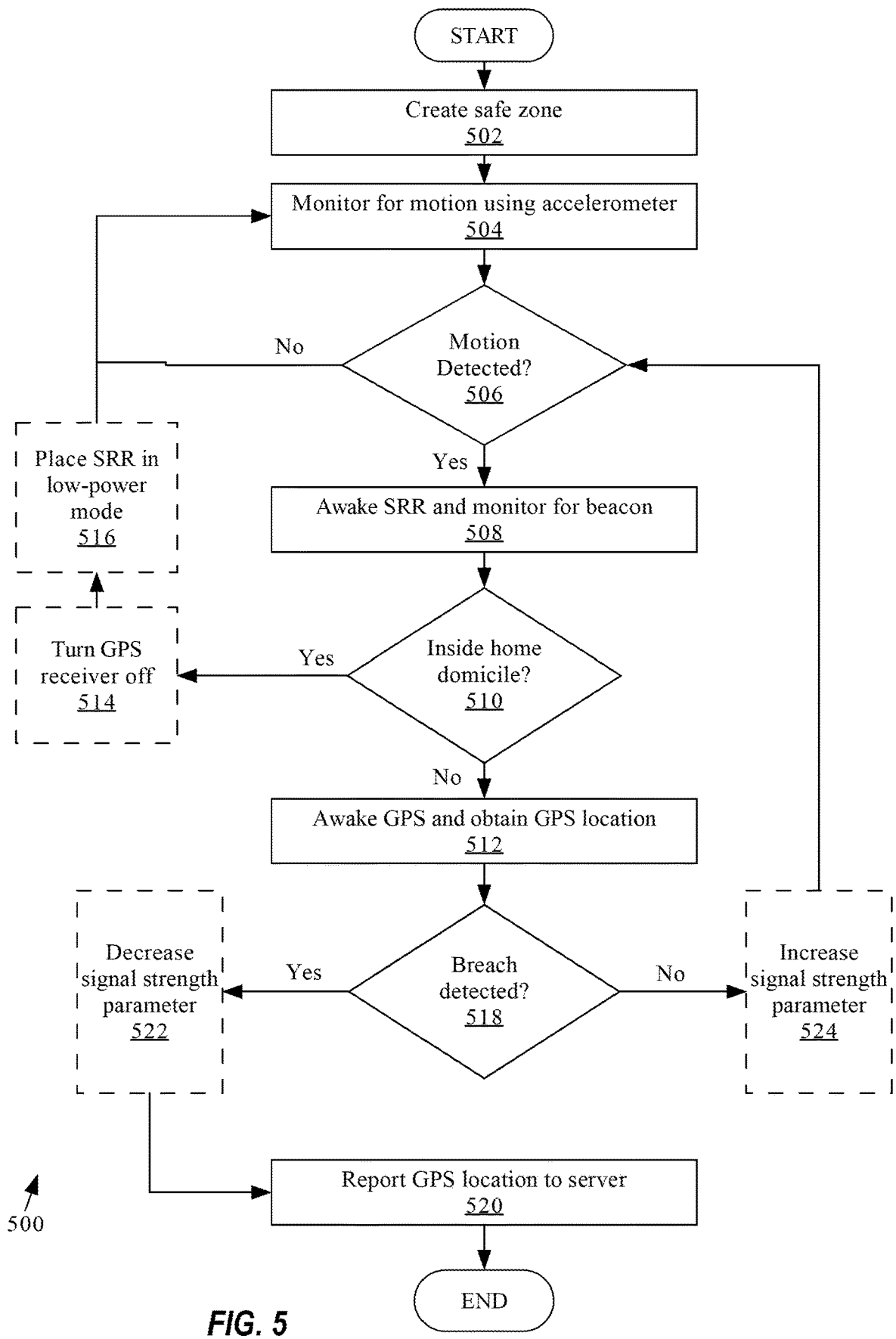
FIG. 5 is a flow chart that illustrates a process for reporting breach events utilizing a tracking system for an example embodiment.

FIG. 5 illustrates a process for implementing a layered tracking system for an example embodiment. The process 500 includes creating (502) a safe zone to generate a boundary perimeter as described above. When the object being monitored is at rest (i.e. the tracker is at rest), an accelerometer associated with the tracker is "awake" and monitoring (504) for motion. However, the cellular and/or GPS radios are off, and the SRR remains in a very low-power state. When motion is detected (506) by the accelerometer, the SRR turns on, and begins listening (508) for the beacon signal from the beacon generator. If the tracker determines that it is inside the domicile based upon the beacon signal (510) as further described below, the SRR is placed in its low-power mode (516) (and the cellular and/or GPS radios remain off (514)) since the tracker is in its domicile. If a user performs a check for location at this stage, the system can inform the user that the object is near the beacon generator. In many embodiments, the beacon monitoring (510) continues as long as there is motion detected. Alternatively, monitoring may continue even when motion is not detected, or for any other reason. However, if the tracker determines that it is outside the domicile based upon the beacon signal (510), then the cellular and/or GPS radios are turned on (512) in addition to the SRR. In various embodiments, the tracker proceeds to repeatedly check its GPS location (512) to evaluate (518) whether a breach event has occurred (i.e. determine whether the tracker is inside or outside the safe zone).

In several embodiments, GPS fixes (i.e. GPS location information) are only reported (520) to the GPS server system if a breach is detected (518). When the tracker determines that it is outside the boundary based upon the beacon signal, the same repeated monitoring of GPS and beacon signals continues whether inside or outside the safe zone perimeter, because even if the tracker is outside the perimeter, it can be useful to detect when the tracker has returned to the domicile (a return home is determined either by an entrance breach event utilizing GPS or by detecting the beacon signal again). In many embodiments, if the user checks location while the tracker is outside the domicile (based upon the beacon signal), a fresh GPS fix is acquired and returned to determine the tracker's location. In various embodiments, whenever the tracker determines that it is inside the domicile based upon the beacon signal, the cellular and/or GPS radios are turned back off (514), and whenever the tracker is in beacon range but motion has stopped, the SRR is returned (516) to a very low-power state.

As described above, the power consumption of the tracker can be affected significantly by how frequently the unit checks for the beacon signal utilizing the SRR and also by how frequently the tracker checks GPS location when it is out of range of the beacon. Further, power consumption can also be affected by how well the beacon signal covers the domicile. By increasing the signal to achieve better coverage, the cellular and/or GPS radio can remain off at a higher percentage of the time. However, in many embodiments, the signal is constrained since it should not exceed the home boundaries, and thus allowing the cellular and/or GPS radios to be turned on and detect exit breaches. In various embodiments, the distance that the beacon signal covers can be programmed utilizing the tracker through a minimum received signal strength parameter.

Figure 6:
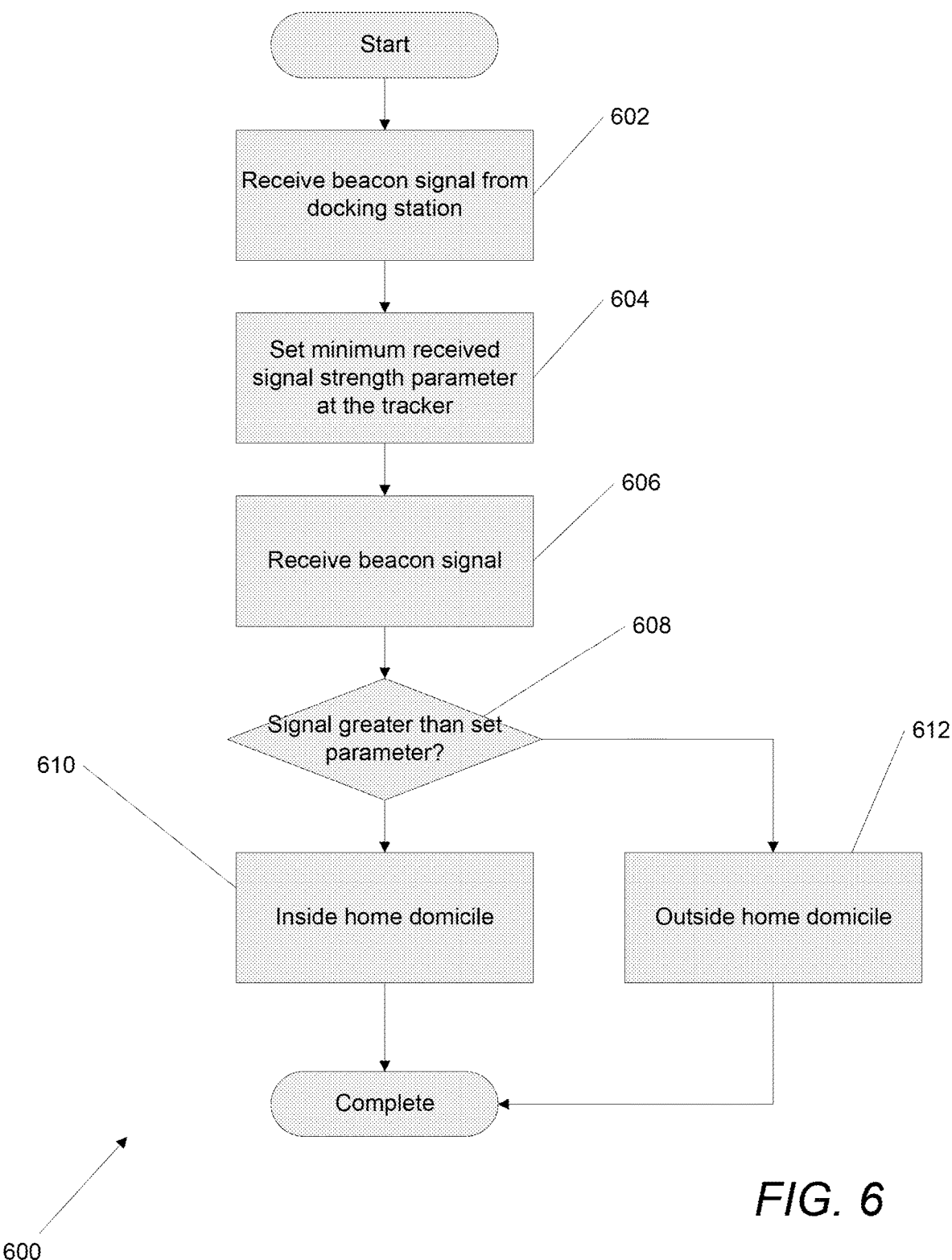
FIG. 6 is a flow chart that illustrates a process for determining if a tracker is located inside a domicile for an example embodiment.

FIG. 6 illustrates a process for determining whether a tracker is inside a domicile for an example embodiment. The process 600 includes receiving (602) a beacon signal transmitted by a beacon generator at its maximum allowable power level. In many embodiments, the tracker is configured to set (604) a minimum received signal strength parameter. Upon receipt of a beacon signal (606), a determination is made (608) as to whether the received signal is greater than the set minimum received signal strength parameter. If the received signal strength is greater than or equal to the predetermined minimum threshold, then the tracker considers itself "inside" the beacon range and thus inside the domicile (610). If the received signal strength is less than the set minimum received signal strength parameter, then the tracker concludes that it is outside the beacon range and thus outside the domicile (612).

In various embodiments, to change the coverage area of the beacon signal, the tracker's minimum received signal strength parameter is modified. In several embodiments, the tracker is often able to detect a signal even at times that it considers itself "outside" of the beacon range, and detection of this low-level signal could be useful for other optimizations of the tracker. Although not illustrated in process 600, as discussed above, if the beacon signal is not detected at all, then the tracker can also conclude that it is outside the beacon range. Although specific processes for implementing a layered tracking system for power conservation are discussed above with respect to FIG. 5, FIG. 6, any of a variety of processes for implementing a layered tracking system to conserve power can be utilized in various embodiments. Power conservation techniques by creating dynamic safe zones in various embodiments are discussed further below.

Dynamic Creation of Safe Zones

When a tracking device is outside its primary domicile, it can often come to rest at a new place that becomes its new temporary domicile. For example, a piece of equipment (with a tracker attached) might move from a storage location to another storage location or to a job site. Another example might be a dog that spends most of its time at a residence but also accompanies its owner to a work place. Thus, it may be valuable to establish additional safe zones and monitor departures from the secondary domicile.

Figure 7:
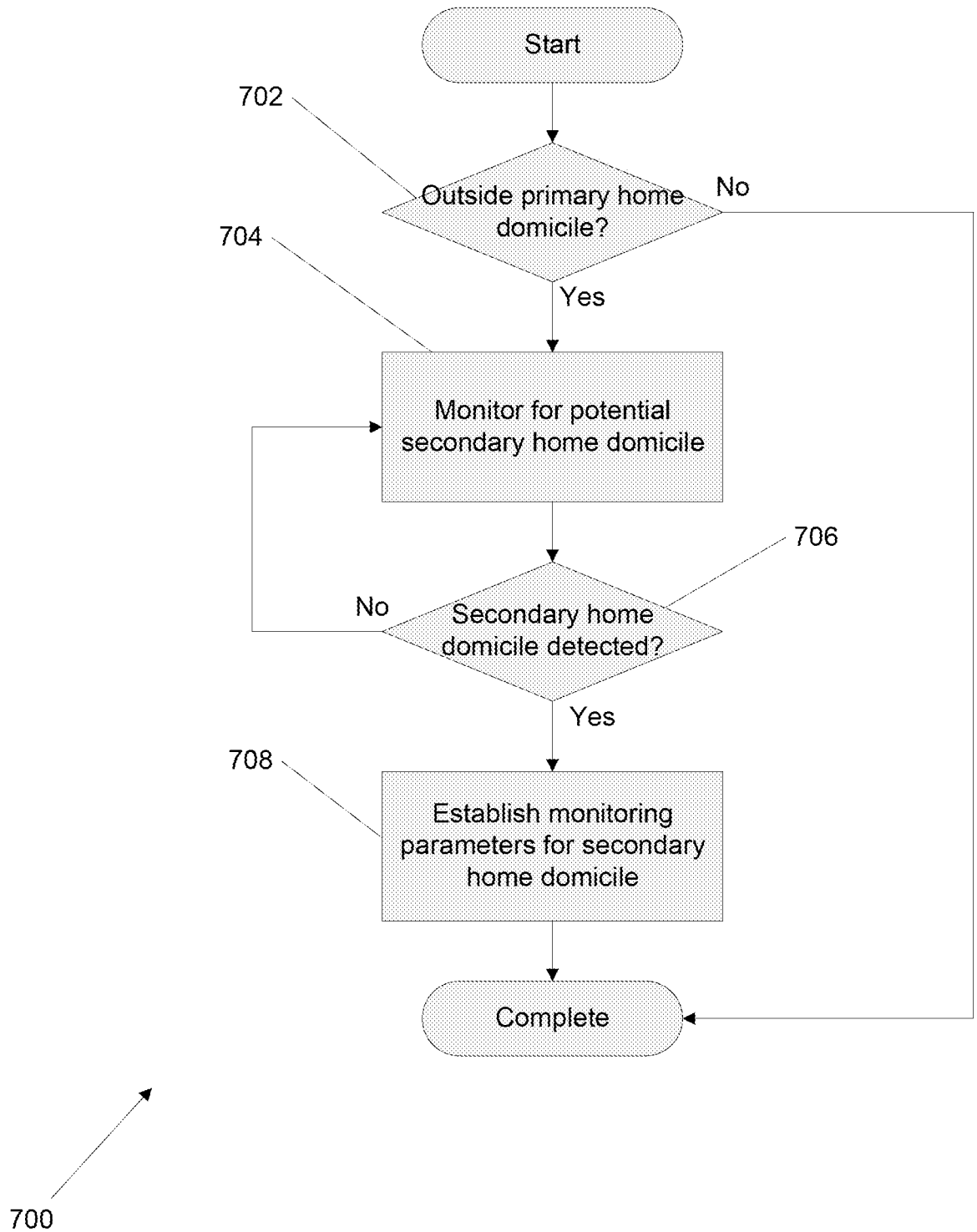
FIG. 7 is a flow chart that illustrates a process for dynamically creating safe zones for power conservation for an example embodiment.

FIG. 7 illustrates a process for power conservation by dynamically creating safe zones for an example embodiment. The process 700 includes determining (702) whether the tracker is outside its domicile as discussed above. In many embodiments, once the tracker has left the domicile it can monitor (704) for when it has come to rest at a new secondary domicile by utilizing its sensors including (but not limited to) an accelerometer, cellular and/or GPS radios, and SRR or user input via a user interface device. In several embodiments, the tracker can scan for radio signals characteristic of a secondary domicile in dynamically creating additional safe zones. In many embodiments, the various radio signals can be validated either through the nature of the signal (such as a cellular signal), or through user input, or based on detection of the signal consistently over a period of time at a particular location and thereby associating the signal as being "fixed" that location.

Upon detecting (706) a secondary domicile, the tracking device can establish (708) various monitoring parameters of its new safe zone. In several embodiments, monitoring the secondary domicile can include capturing a GPS location of the secondary domicile and automatically establishing a boundary to enable monitoring as described above. In many embodiments, a local SRR signal may be detected to determine whether the tracker is inside or outside the secondary domicile as described above. For example, the secondary domicile may have its own beacon generator that sends a SRR signal that the tracker can detect using its SRR receiver. In a variety of embodiments, the tracker can monitor acceleration data over time to infer that it might have departed the secondary domicile. Although specific processes for dynamically creating safe zones for power conservation are discussed above with respect to FIG. 7, any of a variety of processes for creating safe zones for conserving power can be utilized in various embodiments. Various tracker and server system hardware components in various embodiments are discussed further below.

Tracker and Application Server System Hardware

Figure 8:
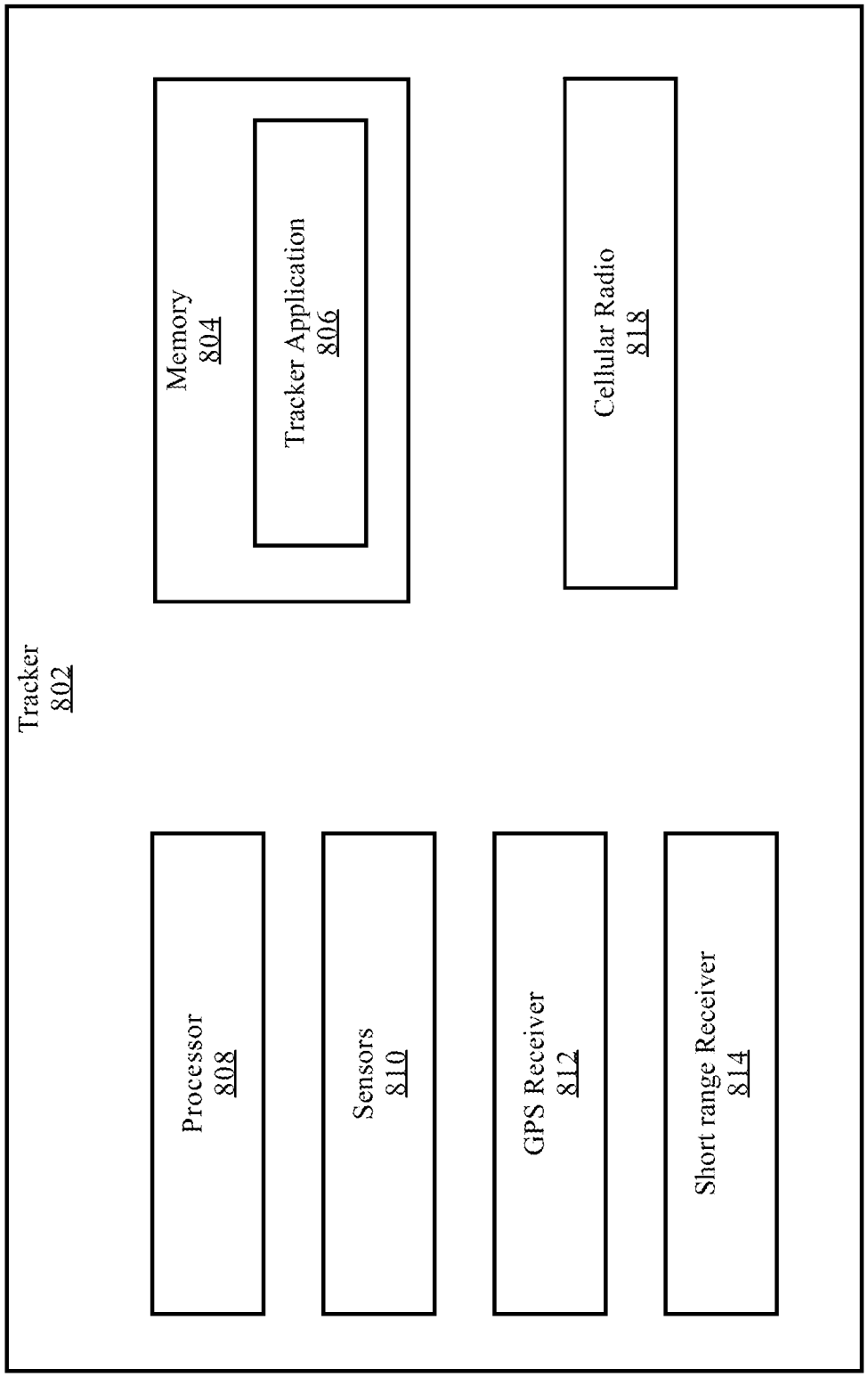
FIG. 8 is a hardware diagram of a tracker for an example embodiment.

As described above, wearable tracking systems can include various trackers, beacon generator, and server systems in monitoring a tracked object. FIG. 8 is a hardware diagram of a tracker for an example embodiment. The tracker 802 can include a memory 804 that contains a tracker application 806 that can configure a processor 808 to perform various functionalities in implementing tracking systems as described above. In many embodiments, the tracker can also include various sensors 810 including (but not limited to) an accelerometer and/or temperature sensors. The tracker can further include various receivers/transceivers such as (but not limited to) a GPS receiver 812 and a SRR 814. In addition, the tracker can also include a cellular radio to send alerts to the application and/or GPS server systems as discussed above.

Figure 9:
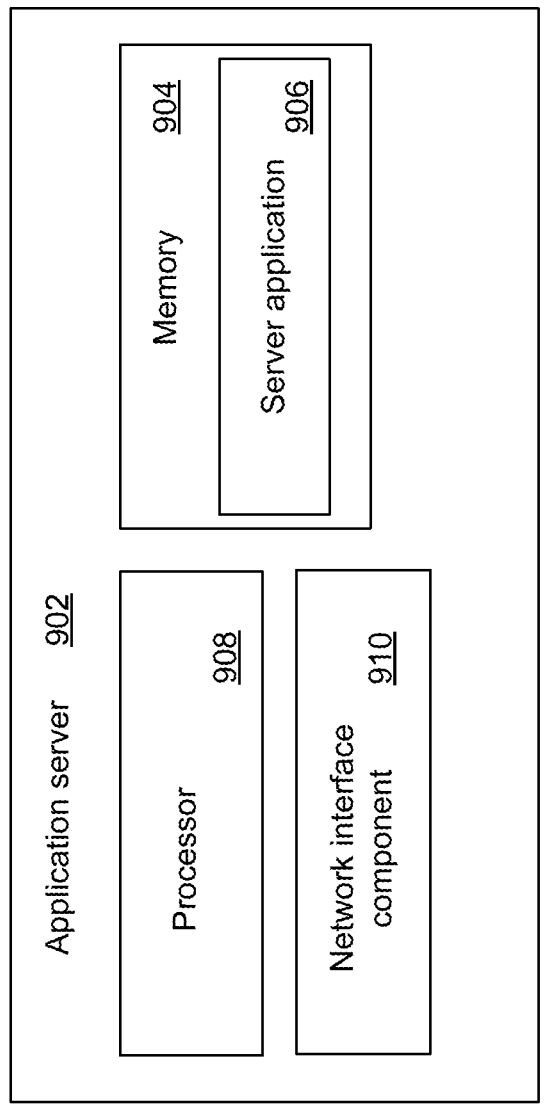
FIG. 9 is a hardware diagram of an application server system for an example embodiment.

FIG. 9 is a hardware diagram of an application server system for an example embodiment. The application server system 902 can include a memory 904 that contains a server application 906 that can configure a processor 908 to perform various functionalities in implementing tracking systems as described above. In various embodiments, the application server system 902 can include a network interface component 910 that allows the application server to connect to and exchange data via the Internet. Although specific tracker and application server systems are discussed above with respect to FIG. 8, FIG. 9, any of a variety of trackers and server systems for tracking systems as appropriate to the requirements of a specific application can be utilized in various embodiments. Further, as described above, the tracker, servers (and beacon generator) can include various components and be configured to perform the functions of other components. For example, in many embodiments, the tracker, beacon generator, and/or servers can include hardware to perform interchangeable functionalities. Thus, in a variety of embodiments, the components can comprise hardware as appropriate to the requirements of the specific application Example Embodiments Embodiments may be practiced using any of the combinations discussed above and/or below. Although many combinations have been discussed, additional example embodiments are discussed below.

Turning to FIG. 1, in one embodiment, beacon generator 104 may be any computing device, networking component, or other device, and may communicate with any of the various components of FIG. 1 using any method or type of communication. For example, beacon generator 104 may be a wireless router or access point, or a laptop. As another example, beacon generator 104 may be a docking station specifically designed for use with tracker 102. In addition to the methods discussed above, beacon generator 104, tracker 102, or any other component of FIG. 1 may communicate using the Industrial Scientific and Medical (ISM) radio bands, such as ISM 915 MHz, or any other ISM band.

Turning to FIG. 5, in one embodiment, the process discussed in FIG. 5 may be triggered based on other inputs than the accelerometer/motion. Specifically, FIG. 5 explains that motion is monitored for using the accelerometer in step 504 and, when motion is detected 506, the SRR is awoken and the beacon is monitored for 508. However, the SRR may be awoken for other reasons than accelerometer motion or input. For example, the SRR may be awoken based on a timer, such as every ten minutes, to ensure that the tracker is still within the safe zone and/or domicile. As another example, the tracker may be awoken based on temperature change (moving from inside a house to outside a house may result in a large temperature change, for example), battery state, and/or any other input available. In other words, step 506 may, in some embodiments, be a determination of whether "motion detected or scan timeout."

Further, the size of a safe zone, or domicile, may be dynamically adjusted. Specifically, in one example, a safe zone may be created 502 around a home domicile. When the SRR is awoken based on movement, time, or any other input 506, 508, a determination is made whether the tracker is inside the home domicile 510 based on the presence of a beacon signal. As discussed in FIG. 6, the strength of the beacon signal may affect the size of the home domicile. Thus, if a determination is made that the tracker is outside of the home domicile based on the absence of a beacon signal, and a GPS location is obtained 512, a determination may be made if a breach has been detected 518. In the instance where a breach is not detected, the signal strength parameter is increased 524. By increasing the signal strength parameter the boundaries of the home domicile are increased. Likewise, if a breach is detected, then the signal strength parameter is decreased 522. By decreasing the signal strength parameter the boundaries of the home domicile are decreased. Thus, using this method, the effective size of a domicile based on a beacon signal may be dynamically adjusted—both up and down.

Turning to FIG. 6, step 602 may be performed using less than the maximum allowable power level. Any power level may be used.

While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A data processing method comprising:
   determining, via an electronic digital tracking device, based on the absence of a signal from a beacon generator, that the tracking device is outside a primary domicile;
   in response to a current location of the tracking device satisfying a condition, creating and storing in memory digital data defining a secondary domicile for the tracking device, wherein the condition is an amount of time spent at the location;
   while the tracking device is within the secondary domicile, reducing power consumption of the tracking device.

2. The method of claim 1, further comprising monitoring a location of the tracking device using a first sensor of a plurality of sensors of the tracking device.

3. The method of claim 2, further comprising reducing the power consumption by using a second sensor of the plurality of sensors of the tracking device to monitor the location of the tracking device instead of the first sensor.

4. The method of claim 3, wherein the first sensor is a GPS receiver, and wherein the second sensor is a motion sensor.

5. The method of claim 1, wherein the determining that the tracking device is outside the primary domicile is determined by a short-range radio (SSR) within the tracking device detecting the absence of the signal from the beacon generator.

6. The method of claim 5, wherein the beacon generator includes a battery charger capable of charging a battery of the tracking device.

7. The method of claim 5, wherein the condition includes the presence of a second signal from a beacon generator.

8. The method of claim 1, further comprising adjusting a signal strength parameter in response to the tracking device increasing power consumption without a breach occurring.

9. A computer system comprising:
   a beacon generator that is programmed to produce a signal;
   a tracking device comprising a plurality of sensors, a processor, and a non-transitory computer-readable storage media storing instructions which, when executed by the processor, cause:
   determining the tracking device is outside a primary domicile based the absence of a signal from a beacon generator;
   in response to a current location of the tracking device satisfying a condition, creating and storing in memory digital data defining a secondary domicile for the tracking device, wherein the condition is an amount of time spent at the location; and
   while the tracking device is within the secondary domicile, reducing power consumption of the tracking device.

10. The system of claim 9, further comprising instructions stored in the storage media which when executed cause monitoring the location using a first sensor of the plurality of sensors of the tracking device, and reducing the power consumption by using a second sensor of the plurality of sensors to monitor the location of the tracking device instead of the first sensor.

11. The system of claim 10, wherein the first sensor is a GPS receiver, and wherein the second sensor is an accelerometer.

12. The system of claim 9, wherein the determining that the tracking device is outside the primary domicile is determined by a short-range radio (SRR) within the tracking device detecting the absence of the signal from the beacon generator.

13. The system of claim 12, wherein the beacon generator further comprises a battery charger capable of charging a battery of the tracking device.

14. The system of claim 9, wherein the computer-readable media comprises instructions which, when executed by the processor, further cause adjusting a signal strength parameter in response to the tracking device increasing power consumption without a breach occurring.

15. A method comprising:
 storing in a memory on a tracking device first data associated with a primary domicile for the tracking device and second data associated with a secondary domicile for the tracking device;
 determining that the tracking device is in the primary domicile or the secondary domicile via a first unit of the tracking device detecting a presence of a signal including first data or second data from a beacon generator;
 setting, by the tracking device, the first unit to a low power state and monitoring the tracking device for motion using a motion sensor;
 in response to detecting motion of the tracking device using the motion sensor, activating the first unit and determining whether the tracking device is in the primary domicile or the secondary domicile.

16. The method of claim 15, further comprising:
 when the tracking device is not in the primary domicile or secondary domicile, activating a GPS sensor in the tracking device and determining a location of the tracking device using the GPS sensor.

17. The method of claim 16, further comprising:
 determining that the location is outside the primary domicile and is outside the secondary domicile;
 in response to determining that the location is outside the primary domicile, generating and sending an alert message from the tracking device to a server.

18. The method of claim 15, further comprising, in response to determining that the tracking device is in the primary domicile or in the secondary domicile, returning the first unit to the low power state.

19. A tracking device, comprising:
 a processor, a GPS receiver connected to the processor, a short range receiver connected to the processor, a motion sensor connected to the processor and a memory connected to the processor;
 wherein the memory includes first data associated with a primary domicile for the tracking device and second data associated with a secondary domicile for the tracking device;
 wherein the short range receiver is configured to detect a signal from a beacon generator;
 wherein the tracking device determines the tracking device is in the primary domicile upon detection of the first data in the signal and determines the tracking device is in the secondary domicile upon detection of the second data in the signal,
 wherein the tracking device enters a reduced power state and monitors the tracking device for motion using the motion sensor upon determination that the tracking device is in the primary domicile or the secondary domicile.

20. The apparatus of claim 19, wherein:
 the tracking device determines the tracking device is not in the primary domicile upon detecting absence of the first data in the signal;
 the tracking device determines the tracking device is not in the secondary domicile upon detecting absence of the second data in the signal; and
 the tracking device activates the GPS receiver upon determining that the tracking device is not in the first domicile and is not in the second domicile.

* * * * *